United States Patent [19]
Colbachini

[11] Patent Number: 4,808,767
[45] Date of Patent: Feb. 28, 1989

[54] FLEXIBLE HOSE ASSEMBLY FOR DIVING SUITS

[76] Inventor: Giuseppe Colbachini, Via Fossona, 77, 35030 - Cervarese Santa Croce, Padova, Italy

[21] Appl. No.: 122,198

[22] Filed: Nov. 18, 1987

[30] Foreign Application Priority Data

Dec. 16, 1986 [IT] Italy .................. 22716 A/86

[51] Int. Cl.⁴ .................. F16L 11/12; B63C 11/20
[52] U.S. Cl. .................. 174/47; 138/103; 128/201.27
[58] Field of Search .............. 138/127, 133, 137, 153, 138/103, 124, 125, 126, 134, 138, 172, 174, 153, 118, 123, 129, 138; 128/201.19, 201.27, 202.27, 204.18, 204.17, 203.17, 203.26; 174/47; 340/850; 604/281, 282; 405/186, 187

[56] References Cited

U.S. PATENT DOCUMENTS

| | | | |
|---|---|---|---|
| 281,223 | 7/1883 | Rogers | 138/127 |
| 2,730,133 | 1/1956 | Holland-Bowyer | 138/127 |
| 3,212,528 | 10/1965 | Haas | 138/138 |
| 3,420,276 | 1/1969 | Skinner | 138/127 |
| 3,603,719 | 9/1971 | Lejeune | 138/127 X |
| 3,729,028 | 4/1973 | Horvath et al. | 138/133 X |
| 4,138,178 | 2/1979 | Miller | 174/47 |
| 4,402,346 | 9/1983 | Cheetham | 138/138 |

FOREIGN PATENT DOCUMENTS

| | | | |
|---|---|---|---|
| 484389 | 5/1938 | United Kingdom | 138/127 |
| 797500 | 7/1958 | United Kingdom | 174/47 |

*Primary Examiner*—Henry J. Recla
*Assistant Examiner*—Glenn T. Barrett
*Attorney, Agent, or Firm*—Bucknam and Archer

[57] ABSTRACT

There is disclosed a flexible hose for supplying air to persons wearing diving suits or the like protecting garments and working in dangerous water or air environments, including data communication lines for transmitting and receiving voice and measurement data. The flexible hose comprises a tube like element in the wall of which there is embedded a metal coil thereon there are wound electric or telephonic cables which are embedded in a rubber layer and encompassed by an antitearing fabric layer and an antiabrasive rubber outer layer.

2 Claims, 1 Drawing Sheet

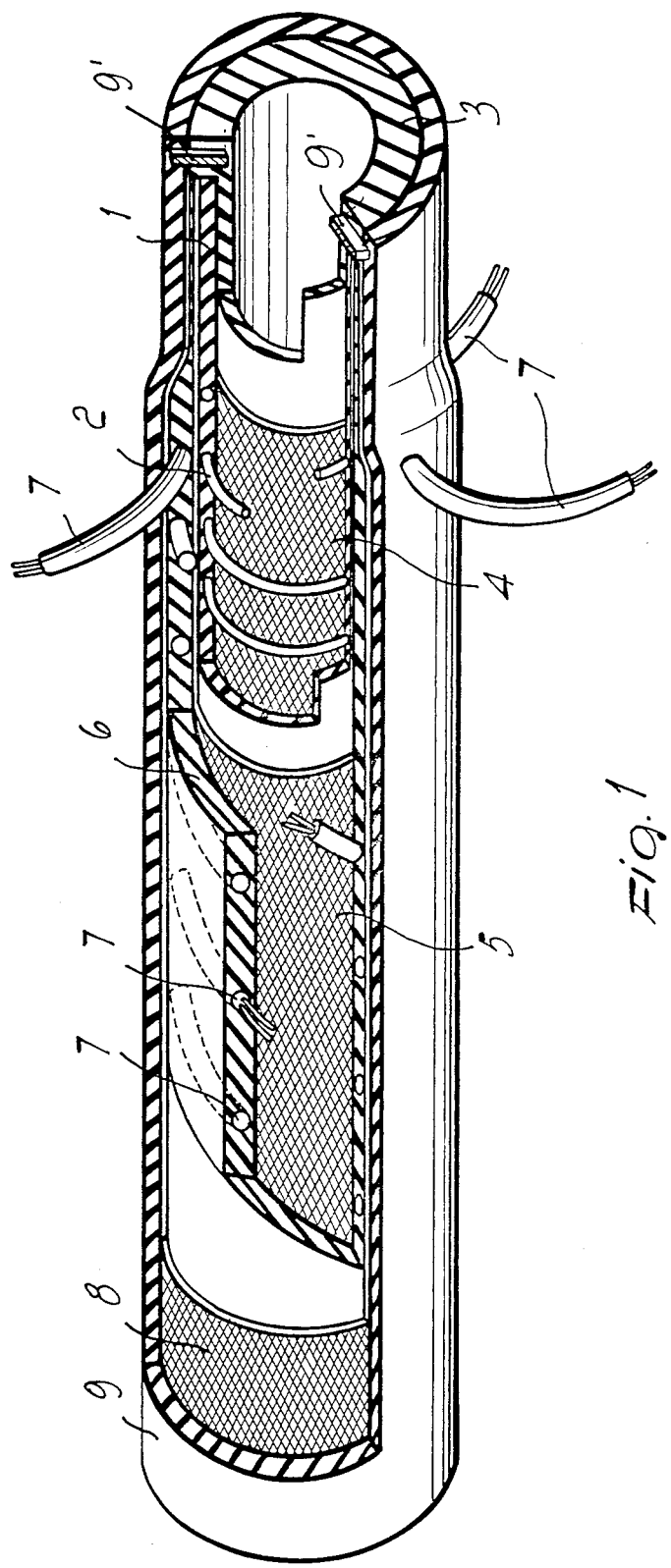

FLEXIBLE HOSE ASSEMBLY FOR DIVING SUITS

BACKGROUND OF THE INVENTION

The present invention relates to an improved structure flexible hose for supplying air to persons wearing diving suits or the like protecting garments and working in dangerous water or air environment, the hose including lines or cables for transmitting and receiving voice and data signals, and to a method for making the flexible hose.

As is known a person working in a water environment, such as a diver, is usually protected by a diving suit supplied with air through a rubber flexible hose.

A like protecting garment is also used for persons working in dangerous air environments, that is environments of toxic gases and the like.

Also known is the fact that communication means must be provided for allowing for the diver to communicate with a control station, therefrom respiration air is also supplied.

These communication means usually consist of a telephonic apparatus and, advantageously, of low voltage supplied data communication apparatus, intended for measurement purposes.

These apparatus, in particular, are usually coupled by means of dedicated electric cables which generally extend on a side of the respiration air supplying flexible hose and are restrained on its outer wall by means of clamping band or the like.

Thus, these electric cables are susceptible to damages and/or interruptions, in addition to hampering the user movements.

SUMMARY OF THE INVENTION

Accordingly, the task of the present invention is to overcome the above mentioned drawbacks, by providing a flexible hose adapted for supplying air and communication data to a person wearing a diving suit or the like protecting garment and working in a dangerous water or air environment.

Within that task, a main object of the present invention is to provide a flexible hose in which the data transmission cables are directly embedded in the structure of the hose itself.

Another object of the present invention is to provide such a flexible hose which is very reliable and safe in operation.

According to one aspect of the present invention the above mentioned task and objects, as well as yet other objects, which will become more apparent thereinafter, are achieved by a flexible hose characterized in that it essentially comprises a tube-like element in the wall of which there is embedded a metal coil thereon there are wound electric or telephonic cables, said cables being embedded in a rubber layer and being coated by an antitear fabric and an outer antiabrasive rubber layer.

BRIEF DESCRIPTION OF THE DRAWINGS

Further characteristics and advantages of the flexible hose according to the present invention will become more apparent from the following detailed description of a preferred embodiment thereof, which is illustrated, by way of an indicative but not limitative example, in the figures of the accompanying drawing where:

FIG. 1 is a broken away view illustrating and end portion of the flexible hose according to the present invention.

DESCRIPTION OF THE PREFERRED EMBODIMENT

With reference to the FIGURE of the accompanying drawing, the flexible hose according to the invention comprises a tube-like core 1 made of a suitable resilient material, in the wall of which there is embedded a metal coil (2).

This metal coil is specifically designed for preventing the tube-like core 1 from being crushed thereby supplying respiration air to the user in a safe manner.

Inside said tube-like core 1 there is provided a sublayer 3, made of an odourless rubber-like material, which is coated by a suitable reinforcing fabric layer 4.

Moreover, above the tube-like core 1 there is further arranged, through the interposition of a further reinforcing textile layer 5, a rubber band 6 in which there are embedded a given number of electric or telephonic cables 7.

In order to protect the mentioned cables from possible damages, the mentioned rubber band encompassing said cables is further coated by an antitear fabric 8 and a further antiabrasive rubber layer 9.

Moreover, in order to prevent possible leaks of the dangerous fluid into the inside of the flexible hose, at end of the mentioned reinforcing fabric layers, there is applied a respective rubber washer 9' which is vulcanized jointly with the hose.

The method for making the flexible hose according to the present invention uses, as is conventional, a rigid mandrel supported by rolling rollers and thereon there are helically wound the flexible hose forming layers.

In such a method, in order to prevent the electric or telephonic cables from being damaged because of their rolling on the mentioned rollers, they are embedded in a crude rubber band, having a thickness greater than the diameter of said cables, and are simultaneously helically wound.

In this connection it should be pointed out that the mentioned cables have their end free portions projecting from the flexible hose, for electrical coupling purposes to data communication or measurement units.

The electric cables, moreover, are suitably spaced from one another and are affixed so as to prevent the flexible hose from being torn at the outlet or projecting portions thereof.

From the above disclosure it should be apparent that the invention fully achieves the intended task and objects.

While a preferred embodiment of the invention has been disclosed and illustrated, it should be pointed out that the disclosed embodiment is susceptible to many modifications and variations coming within its spirit and the scope of the appended claims.

I claim:

1. A flexible hose for supplying air to persons wearing diving suits or the like protecting garments comprising: a resilient tube-like core element; a metal coil embedded in the wall of said tube-like core element; a sublayer made of an odorless mixture lining said tube-like core element; a first reinforcing fabric layer disposed between said sublayer and said tube-like core element; a rubber layer encompassing said tube-like core element having electric cables wound and embedded therein; a second reinforcing fabric layer disposed between said resilient tube-like core element and said rubber layer; an anti-abrasive rubber layer encompassing said anti-tear fabric layer; and wherein said electric cables have respective free ends projecting at given spaced locations from said flexible hose from said rubber layer through said anti-tear fabric layer and said anti-abrasive layer.

2. A flexible hose according to claim 1 wherein said flexible hose includes at least one end and is provided, at said at least one end, with a "projecting" rubber washer which is vulcanized jointly with said flexible hose.

* * * * *